Oct. 27, 1970

HIROSHI TOMINAGA 3,535,901

MOLD FOR FORMING MATERIAL BY MEANS OF
IMPULSIVE HYDRAULIC PRESSURE

Filed May 24, 1967

INVENTOR.
HIROSHI TOMINAGA
BY
ATTORNEYS

Oct. 27, 1970  HIROSHI TOMINAGA  3,535,901
MOLD FOR FORMING MATERIAL BY MEANS OF
IMPULSIVE HYDRAULIC PRESSURE
Filed May 24, 1967  2 Sheets-Sheet 2

INVENTOR.
HIROSHI TOMINAGA
ATTORNEYS

United States Patent Office 3,535,901
Patented Oct. 27, 1970

3,535,901
MOLD FOR FORMING MATERIAL BY MEANS OF IMPULSIVE HYDRAULIC PRESSURE
Hiroshi Tominaga, Yokohama-shi, Japan, assignor to Tokyo Sharyo Seizo Kabushiki Kaisha, Yokohama-shi, Kanagawa-ken, Japan
Filed May 24, 1967, Ser. No. 641,048
Claims priority, application Japan, June 3, 1966, 41/35,434; Aug. 26, 1966, 41/55,808
Int. Cl. B21d 26/04
U.S. Cl. 72—61          6 Claims

ABSTRACT OF THE DISCLOSURE

A mold for forming material by means of impulsive hydraulic pressure comprised of a hollow inner mold member positioned within an outer mold member. A cavity is located in the inner surface of the inner mold member and means are provided for holding material within the inner mold member for forced insertion into the cavity. A chamber is formed between the inner and outer mold members, and means are provided for supplying impulsive hydraulic pressure to the chamber and to the inner surface of the inner mold member. The total pressure in the chamber directed inwardly against the outer surface of the inner mold member is greater than the total hydraulic pressure exerted outwardly against the inner surface of the inner mold member.

Alternatively, a single hollow mold member is used with a cavity arranged in its inner surface to receive the material to be molded. Pistons are arranged within the mold member to secure the ends of the material to be molded and also to apply compression force against the ends of the material. Hydraulic pressure is applied to the inner surface of the material to be molded forcing it into the cavity and, at the same time, the hydraulic pressure is directed against the pistons forcing them against the ends of the material. Each piston has a sloping surface directed inwardly within the hollow space in the mold member and this surface can be varied to change the pressure exerted by the pistons on the ends of the material being molded.

SUMMARY OF THE INVENTION

The object of the present invention is to raise the size and accuracy of a product and to improve the forming character by the betterment of a mold being used for an apparatus for forming the material by means of impulsive hydraulic pressure.

In order to attain this object, the present invention proposes a mold, characterized in that the mold is divided into an inner and an outer mold, the contact faces of both molds providing a chamber of the total area $\Sigma a$ ($a$ denotes the area of the outer surface of the inner mold facing opposite to said chamber), $\Sigma a$ being determined so that $\Sigma a \cdot P$ may be larger than all the pressure of $2\pi RLP$ (R denotes the inner radius of the material, L the length of the portion on which the impulsive hydraulic presure P works from the inside).

Further, the present invention proposes a mold, characterized in that pressure is axially applied from both ends of the material by the use of a piston put under impulsive hydraulic pressure concurrently and in this case the face put under the impulsive hydraulic pressure or the dynamic pressure of the piston, is stepped or inclined and the effective area put under pressure is changed.

Attached drawings show two embodiments of the present invention,

Figure 1:
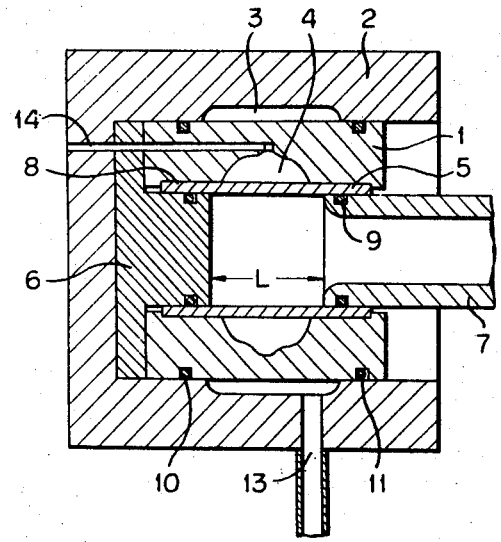
FIG. 1 shows a longitudinal sectional view of the mold for forming the material by means of impulsive hydraulic presure relating to the present invention.
Figure 2:
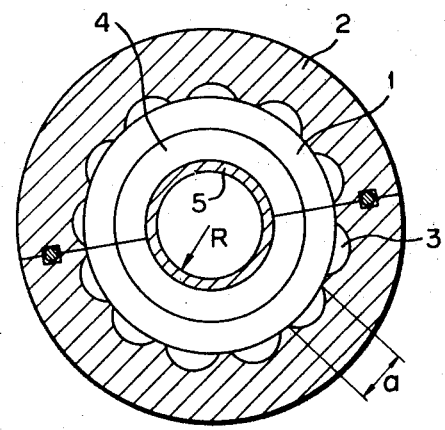
FIG. 2 is a side view of the arrangement shown in FIG. 1.
Figure 3:
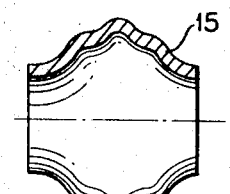
FIG. 3 is a longitudinal sectional view of a part of the product made in the mold by said forming device.

First, in the first embodiment shown in FIGS. 1 to 5, 1 denotes the inner mold, 2 the outer mold, 3 the chamber, 4 the clearance, 5 the material, 6 the material keeping body and in the inside face of the inner mold there is the clearance 4 and the material 5 is inserted therein as shown in FIG. 1, the material keeping body 6 being inserted in one side of the material with the packing 8 and the conduit pipe 7 communicating with the hydraulic pressure chamber (not shown in the drawing) and extending into the other end of the material with the packing 9. In the outside face of said inner mold 1 there is the conduit 13 communicating with the hydraulic pressure chamber (not shown in the drawing) and extending through the inside face of the outer mold 2 into the chamber 3 located between the packing rings 10, 11. The ventilating hole 14 is led to the clearance 4 piercing through the outer mold 2, the material keeping body 6 and the inner mold 1, the arrow directing to the inward from the outward shown in FIG. 2 indicating the force controlling the outer hold 2 from the outside, $a$ denoting the area of the outer surface of the inner mold 1 facing opposite to the chamber 3, FIG. 3 showing the product 15 made by said mold.

Figure 4:
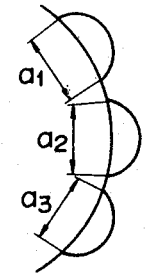
FIGS. 4 and 5 are diagrams which illustrate respectively the condition of the outer mold before it states, at the time when the outer mold of said mold is moved (FIG. 4) and after the outer mold is moved (FIG. 5), parts of the mold are omitted.
Figure 5:
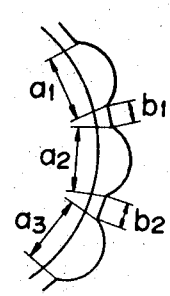

From the above statement, according to the present invention, the inner mold 1 and the outer mold 2 of a relatively small thickness are used and in order that said outer mold may be pushed against the inner mold 1 and that it may not be moved even if it is moved outwardly, it is necessary that all the pressure $\Sigma a \cdot P$, forcing said inner mold inwardly from the outside is larger than all the pressure $2\pi RLP$ exerted on said inner mold outwardly by impulsive hydraulic pressure. As regards the above matter, R denotes the inner radius of the material 5, L the length of the portion of the material on which the impulsive hydraulic pressure works from the inside, P the impulsive hydraulic pressure and especially when the outer mold 2 is moved, $\Sigma a$ is increased as shown in FIG. 4. Namely, when the outer mold 2 is not moved, the formula becomes $\Sigma a = a_1 + a_2 + a_3 + \ldots$ as shown in FIG. 4 and after the outer mold is moved, the formula becomes $\Sigma a' = a_1 + b_1 + a_2 + b_2 + a_3 + b_3 \ldots$ as shown in FIG. 5. Accordingly, the inner mold 1 is pushed more and more inwardly and keeps firmly the material 5 and besides has an automatic regulating action.

Generally, in forming the material by impulsive hydraulic pressure, the material is expanded outwardly and deformed by impulsive hydraulic pressure given to the inside of the material and thus the material is formed according to the shape of the clearance 4 of the mold, but in this case, when the material comes in contact with the mold, the pressure is directed outwardly against this mold is given to said mold too, so that said mold is composed of split molds in proportion to the shape of formation so that the mold may be easily fitted and to take away from the material. At this time, when the mold is moved outwardly by said pressure, there are defects which may, due to the size of the product, become large or the shape of the product may be formed wrong.

Against this, according to said embodiment of the present invention, there are advantages that the mold is divided into the inner and outer molds and the impulsive hydraulic pressure works on the chamber provided between both molds and formation can securely be performed by pressing the inner mold inwardly and, additionally, the construction is simple and the operation is easy. And if the present invention is not used, a mold of a large thickness must be held by a strong construction to prevent the mold from moving, but in the present invention, the object can simply be attained by the inner and outer molds of a relatively small thickness and even if the outer mold is moved outwardly by any chance, the inner mold is pressed inwardly by a big force and is never moved, so that the object can perfectly be attained.

Figure 6:
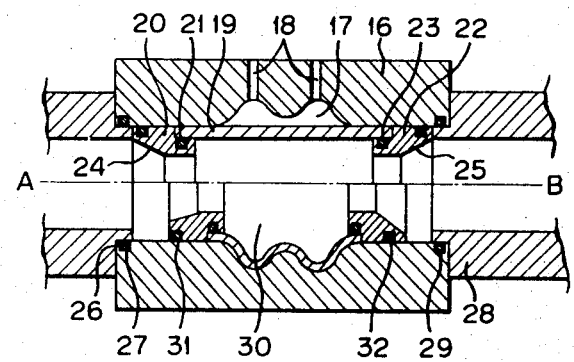
FIG. 6 is a longitudinal sectional view of a second embodiment of the mold.

Next, explanation will be made about the second embodiment shown in FIGS. 6 to 9. In FIG. 6, 16 denotes a mold for forming the material and within the mold and the air hole 18 by which said clearance 17 is c there are clearances 17 for the formation and the air hole 18 by which said clearance 17 is communicated with the open air, and said mold is made into two split ones etc. in order to take out the product in case of need and usually two split molds are integrally bound, the material 19 to be formed being in the mold 16, and in this case, said material 19 is in the shape of tube and the upper side of the central line of FIG. 6 shows the material 19 just before the formation is made and the lower side shows the material after the formation was finished. And 20, 22 each denote a piston which can slide in the mold 16 and at the same time which comes in contact with the end face of the material 19, and packing 21, 23, and 31, 32 is positioned between the material 19 and the mold 16 respectively, as shown in the drawing. On the inner side of the pistons 20, 22, facing away from the material 19 the inclined or stepped faces 24, 25 are formed as shown in FIG. 6 and FIG. 7, and 26, 28 denote channels and on A side or B side, of the mold one or both channels are suitably connected to a hydraulic pressure chamber (not shown in the drawing) of an apparatus for generating liquid pressure by impulsive force and the remaining channel (the channel not connected to said chamber in case only one of the channels was connected to the chamber) is tightly closed by a lid (not shown in the drawing). And 27, 29 denote packing and 30 the water to be enclosed within the material 19.

Thus, explanation will be made about the principle and working of this construction; above the central line of FIG. 6, the material 19 is put in the mold 16, and the inside of said material is filled with water, the piston 20, 22 comes in contact with both ends of said material 19, with A side or B side or A side and B side of the pistons being connected to the hydraulic pressure chamber (not shown in the drawing) of an apparatus for generating liquid pressure by impulsive force and when impulsive hydraulic pressure is generated by tightly closing the remaining side (the side not connected to the hydraulic pressure chamber in case only A side or B side is connected to said chamber), the water 30 within the material 19 becomes immediately highly pressurized and said material is outwardly expanded and formation is performed according to the clearance 17 of the mold 16. This condition of the material is shown below the central line of FIG. 6 and at this time performed not only by giving internal pressure to the material 19 but also the material 19 is pressed from its both sides by the piston 20, 22 which are put under impulsive hydraulic pressure concurrently. so that compound stress occurs within said material 19 and thereby plastic deformation becomes easy and at the same time said material is expanded while it is axially compressed, so that the material can be prevented from becoming too thin or from breaking. Further, packing 27, 29 serves for the prevention of hydraulic pressure leakage.

Now, unless a ratio (rate) between the internal pressure given and said material 19 and the side pressure given axially through the piston 20, 22 is suitably selected, the material becomes too thin for want of the side pressure or on account of too much side pressure the material 19 does not closely adhere to the mold 16 but is folded up. In order to determine the ratio between both, a size and shape of the portion under pressure of the side face of the piston 20, 22 must suitably be selected. Further, a pressure wave of substantially the same dimension does not always work concurrently on A side and B side of the arrangement in FIG. 6 by the reason that the length or position of the transmission course (channel) of the impulsive pressure wave is different, so that a shape and dimension of the face 24, 25 of the piston 20, 22 should be determined according to the object. In this case, a size of the side pressure by the impulsive pressure wave given to the piston 20, 22 cannot always be determined by the formula of (pressure per unit area) × (area under pressure) like the usual hydrostatic pressure and further a dynamic element must be taken into consideration. Accordingly, in FIGS. 7 to 9, if hydrostatic pressure works on each, a size of the force moving the piston in the right direction ought to become the formula of $$(\text{pressure per unit area}) \times \frac{\pi}{4}(d_1^2 - d_2^2)$$

by the difference between the area under pressure. $d_1$, $d_2$, $d_3$, $d_4$ denote the diameter of each part as shown in the drawing. However, as a pulsed pressure wave works actually rightward from the left as dynamic pressure, a size of the force in the rightward direction of the piston is first determined by the formula of $$(\text{dynamic pressure}) \times \frac{\pi}{4}(d_1^2 - d_3^2)$$

(effective area under pressure) and further the effect of each inclined face secondarily appears.

Figure 7:
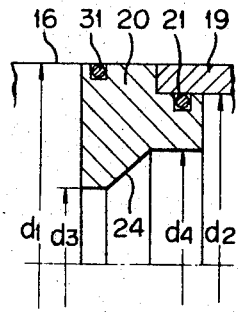
FIGS. 7 to 9 are longitudinal sectional views illustrating, in detail, the construction and shape of the piston in the mold, these drawings show only the upper half of the central line.
Figure 8:
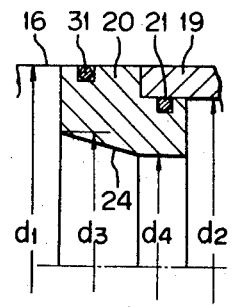
Figure 9:
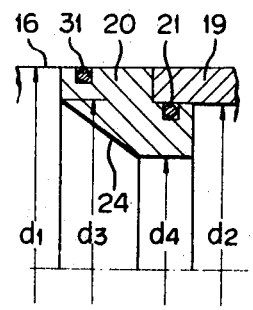

Thus, by stepping the shape of the face 24, 25 of the piston 20, 22 and regulating the side pressure in the case of forming the material by impulsive hydraulic pressure or by changing the inclination as shown in FIGS. 7 to 9 and besides by altering the diameter $d_3$, the size of the effect (force) of the side pressure can freely be changed even if the size of $d_1$ and $d_2$ is definite. Therefore, according to the present invention, in order to improve the forming character, the regulation of the side pressure effect of the piston 20, 22 to which the side pressure is given, can be achieved by changing the diameter $d_3$ of the face 24, 25 of said piston almost regardless of the size of the outer diameter $d_1$, $d_2$ of the material 19 and besides, as $d_1$ is unchanged, there is no necessity of altering the mold 16 and therefore the present invention is extremely practical. Further, in the above case, either piston 20 or 22 may be used, and there is the case whether either is used and side pressure from one direction is especially utilized, as for instance, the case of a special shape of non-symmetry.

What is claimed is:

1. A molding apparatus for forming material by impulsive hydraulic pressure comprising an inner tubular mold member, an annular shaped cavity formed in and extending about the inner surface of said inner mold member, means for securing material within said mold member for holding the material as it is molded into said cavity, an outer tubular mold member encircling and in contact with at least a portion of the outer surface of said inner mold member, said inner and outer mold members combining to form an annular shaped closed chamber disposed therebetween and located radially outwardly from and encircling said cavity in said inner mold member, means for supplying a source of impulsive hydraulic pressure to the interior of said mold member for acting against the radially inner surface of the material to be molded, the area of the exterior surface of said inner mold member within said chamber and the hydraulic pressure exerted thereagainst being arranged so that the total hydraulic pressure exerted within said chamber against the exterior surface of said inner mold is greater than the total hydraulic pressure exerted on the material in the interior of said inner mold member for forcing the materail into said cavity in the inner surface of said inner mold member whereby the position of said innermold member is secured against displacement during the molding operation though the impulsive hydraulic pressure is acting radially outwardly on said inner mold member.

2. A molding apparatus, as set forth in claim 1, wherein said inner and outer mold members are made of relatively thin material.

3. A molding apparatus, as set forth in claim 1, wherein each of said inner and outer mold members are formed of at least two separable parts.

4. A molding apparatus, as set forth in claim 1, wherein packing is positioned between said inner and outer mold members on each side of said chamber for preventing the loss of hydraulic fluid between said mold members.

5. A molding apparatus, as set forth in claim 4, wherein packing is positioned between said means for securing material within said inner mold member and the material to be molded for preventing the loss of hydraulic fluid therebetween.

6. A molding apparatus, as set forth in claim 1, wherein a vent extends through said inner mold member into said cavity for affording communication between said cavity and the exterior of said mold.

References Cited
UNITED STATES PATENTS

| | | | |
|---|---|---|---|
| 1,930,745 | 10/1933 | Fisher | 29—421 |
| 2,410,857 | 11/1946 | Ahern | 72—60 |
| 2,728,317 | 12/1955 | Clevenger et al. | 29—421 |
| 3,177,689 | 4/1965 | Christian et al. | 72—56 |
| 3,203,212 | 8/1965 | Simicich | 72—56 |
| 3,379,043 | 4/1968 | Fuchs | 72—60 |
| 2,652,121 | 9/1953 | Kearns et al. | 72—61 |
| 3,358,489 | 12/1967 | Hutchins | 72—62 |

RICHARD J. HERBST, Primary Examiner

U.S. Cl. X.R.

29—421